United States Patent [19]

Kobayashi et al.

[11] 3,728,698

[45] Apr. 17, 1973

[54] MAGNETIC THIN FILM PLATED WIRE MEMORY

[75] Inventors: Seihin Kobayashi; Michihiro Torii; Takehiko Jojima; Masanao Okuda, all of Hamana-gun, Shizuoka-ken, Japan

[73] Assignee: Fuji Denki Kagaku Kabushiki Kaisha, Tokyo, Japan

[22] Filed: Aug. 24, 1971

[21] Appl. No.: 174,358

[30] Foreign Application Priority Data

Aug. 29, 1970 Japan ................................45/86434
Sept. 29, 1970 Japan ................................45/96590

[52] U.S. Cl..340/174 BC, 340/174 GP, 340/174 JA, 340/174 M, 340/174 PW, 340/174 TF, 340/174 VA

[51] Int. Cl...........................G11c 11/14, G11c 11/04

[58] Field of Search.................340/174 BC, 174 VA, 340/174 GP, 174 JA, 174 PW

[56] References Cited

UNITED STATES PATENTS 3,623,032 11/1971 Schapira........................340/174 BC
3,623,035 11/1971 Kobayashi....................340/174 VA

*Primary Examiner*—James W. Moffitt
*Attorney*—Fleit, Gipple & Jacobson

[57] ABSTRACT

In a magnetic thin film plated wire memory, a magnetic keeper comprises a base portion and a number of elongated protrusions spaced with each other at fixed spaces to form grooves therebetween, the base portions and the protrusions being integral with each other. Within the magnetic keeper, a number of driving wires are embedded to intersect at right angles with the elongated protrusions with their upper surface exposing to the outside of the base portion of the magnetic keeper at the grooves between the elongated protrusions. Each groove snugly contains therein a magnetic wire.

6 Claims, 10 Drawing Figures

INVENTORS

Seihin Kobayashi
Michihiro Torii
Takehiko Jojima
Masanao Okuda

BY

Flint, Gippie & Jacobson ATTORNEYS

MAGNETIC THIN FILM PLATED WIRE MEMORY

This invention relates to a magnetic thin film plated wire memory of the type wherein a number of magnetic wires (digit-sense wires) and driving wires (word wires) are arranged at right angles with each other on a magnetic keeper.

In a known magnetic thin film plated wire memory of the type mentioned above, when a drive current is applied to the driving wire, magnetic flux generated around the driving wire forms closed flux paths at points intersected by the magnetic wires. However, the magnetic flux does not form closed flux path at places other than the intersections. The latter magnetic flux is deformed and widened by demagnetizing force of the magnetic keeper. The widened magnetic flux affects the magnetic flux at the intersections to deform and widen the latter flux. Accordingly, the magnetic flux at the adjacent intersections interacts with bad affect upon memory characteristic.

To avoid such interactions of the magnetic flux at the intersections, the spaces between the adjacent driving wires have been relatively wide in the conventional magnetic thin film wire memories, so that packing density of memory elements has been relatively low. To make the packing density of memory elements higher in the conventional memories, drive current applied to the driving wires has to be increased.

Accordingly, an object of the present invention is to provide a magnetic thin film wire memory in which interactions between adjacent conductive wires are reduced to minimum to be operatable at lower drive current.

Another object of the present invention is to provide a magnetic thin film wire memory having higher packing density of memory elements.

Another object of the present invention is to provide a magnetic thin film wire memory of the kind defined as above in which the magnetic keeper is reinforced.

According to the present invention, a magnetic thin film plated wire memory comprises a magnetic keeper having a base portion and a number of elongated protrusions integrally formed with said base portion, said protrusions being spaced with each other at fixed spaces to form grooves therebetween, a number of driving wires embedded within said magnetic keeper to intersect at right angles with said elongated protrusions with their upper surface exposing to the outside of said base portion of said magnetic keeper at said grooves, and a number of magnetic wires each snugly disposed in said groove, said magnetic wire having a magnetic thin film plated on a conductive wire.

The aforementioned and other objects and features of the invention will be apparent from the following detailed description of specific embodiments thereof, when read in conjunction with the accompanying drawings, in which:

FIG. 1 (*b*) is a sectional view taken along line b—b in FIG. 1(*a*) and showing magnetic flux around driving wires;

FIG. 1(*c*) is a sectional view taken along line c—c in FIG. 1(*a*) and showing magnetic flux around the driving wires;

Figures 1A, 1B, 1C, 2A, 2B, 2C:
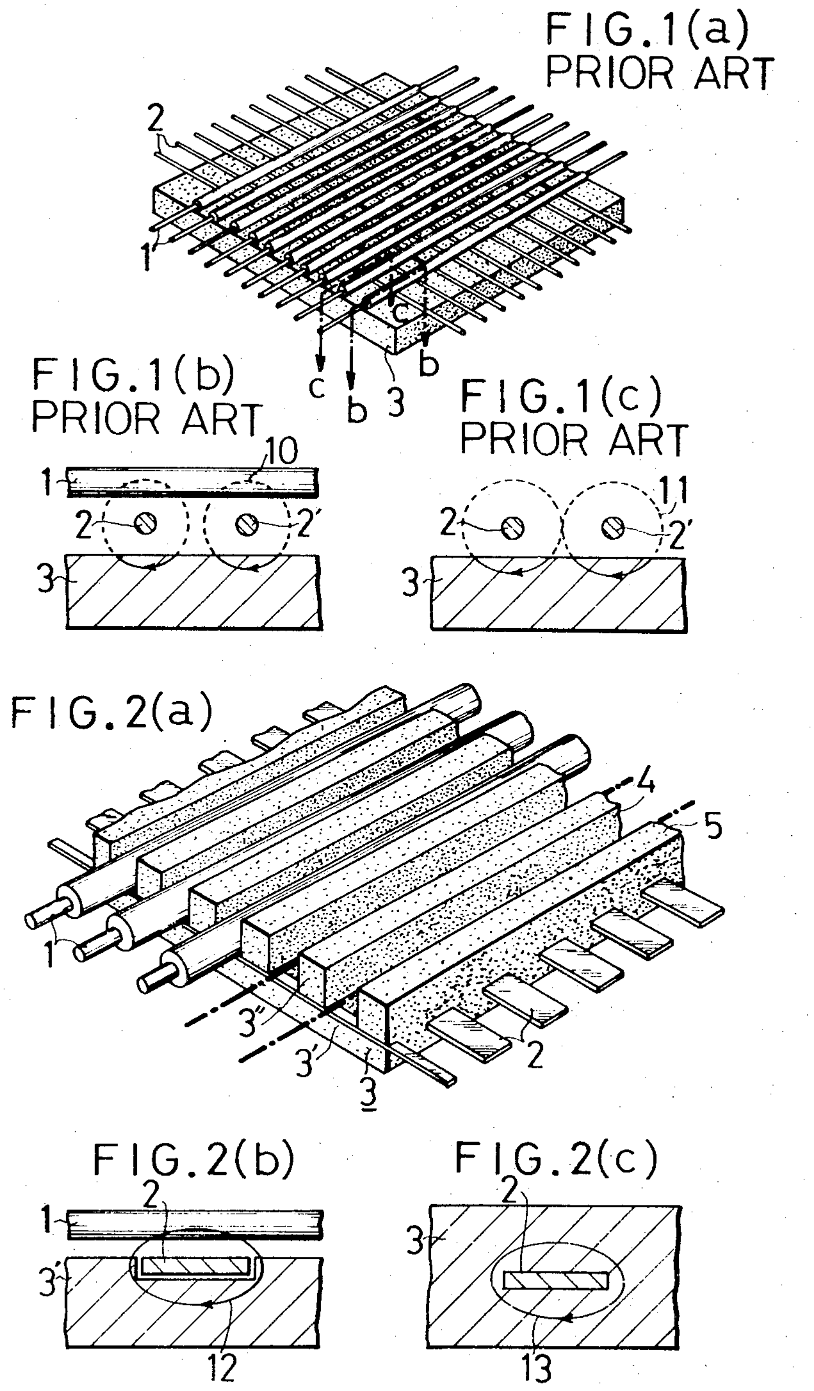
FIG. 1(a) PRIOR ART, FIG. 1(b) PRIOR ART, FIG. 1(c) PRIOR ART, FIG. 2(a), FIG. 2(b), FIG. 2(c)
FIG. 1(*a*) is a perspective view partially showing a magnetic thin film wire memory of prior art.
FIG. 2(*a*) is a perspective view partially showing a magnetic thin film plated wire memory according to the present invention.
Figure 3:
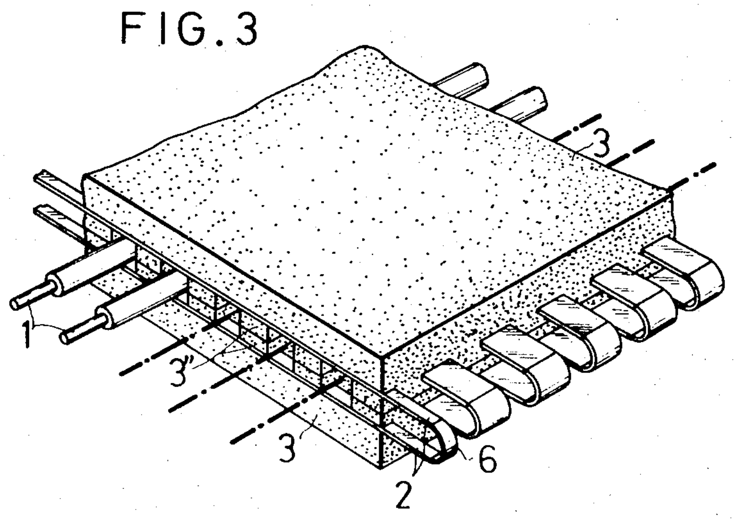
Figure 4:
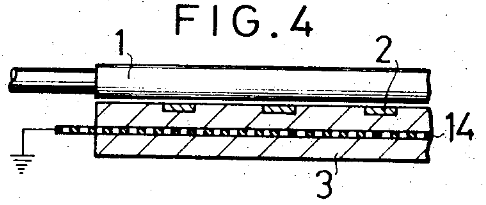
Figure 5:
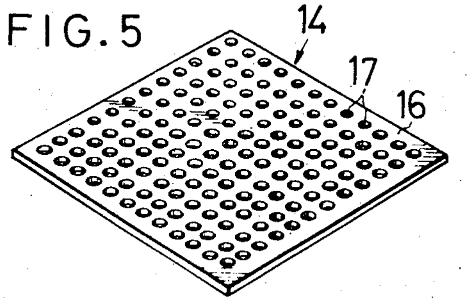
Figure 6:
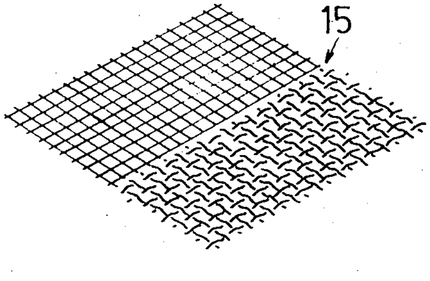

FIGS. 2(*b*) and 2(*c*) are sectional views in FIG. 2(*a*) and showing the state of magnetic flux at positions corresponding to those in FIGS. 1(*a*) and 1(*b*), respectively;

FIG. 3 is a perspective view showing a magnetic thin film plated wire memory according to another embodiment of the present invention;

FIG. 4 is a sectional view partially showing a magnetic thin film plated wire memory according to a third embodiment of the present invention;

FIG. 5 and FIG. 6 show perforated conductive metal plate and wire net, respectively, to be embedded in a magnetic keeper in FIG. 4.

Referring first to a conventional magnetic thin film wire memory shown in FIG. 1(*a*), it comprises a number of magnetic wires 1, a number of ribbon shaped driving wires 2 of 0.13mm width intersecting at right angles with said magnetic wires, and a magnetic keeper locating closely adjacent to said driving wires. Each magnetic wire 1 consists of a conductive wire having a diameter of, for example, 0.1mm and a thin film covering over the conductive wire, the thin film being nickel permalloy electrically plated so that an easy axis of magnetization may be in the circumferencial direction of the film. The magnetic keeper is made of ferrite powder having high magnetic permeability and an organic binder.

In such a magnetic thin film wire memory, when a drive pulse is applied to the driving wire 2, magnetic flux 10 forms a closed flux path due to the magnetic keeper 3 and the magnetic wire 1 at intersections of the driving wire 2 and the magnetic wires 1, as shown in FIG. 1(*b*). However, the flux path 11 is not close but open at places other than the intersections since only the magnetic keeper 3 has high magnetic permeability around the driving wire 2, as shown in FIG. 1(*c*). The flux path 11 is deformed and widened due to demagnetizing field of the magnetic keeper 3. The magnetic field at the intersections and other places around the driving wire 2 or 2' continues along the wire 2 or 2', so that interactions occur between the flux at the intersections and other places with the result that the flux path at the intersections is deformed and undesirably widened. Accordingly, the magnetic flux at adjacent intersections interacts with each other with bad affect upon memory characteristic.

To avoid such interactions, the spaces between the adjacent driving wires have been relatively wide in the conventional magnetic thin film memories, so that packing density of memory elements has been relatively low.

Referring now to a magnetic thin film plated wire memory according to a first embodiment of the present invention, shown in FIG. 2(*a*), a magnetic keeper 3 comprises a base portion 3' and a number of elongated protrusions 3'' spaced with each other at fixed spaces to form grooves 4 therebetween, the base portion and the protrusions being integral with each other. Within the magnetic keeper 3, a number of flat driving wires 2 are embedded to intersect at right angles with the elongated protrusions 3'' with their upper surface exposing to the outside of the base portion 3' of the magnetic keeper at grooves 4 between the elongated protrusions 3''. Each groove 4 snugly contains therein a magnetic wire 1 which easy axis is in the circumferential direction. The magnetic wire 1 is made by electrical plating of nickel permalloy on a conductive wire as made in the conventional method. The magnetic keeper 3 has same compositions as in the conventional one.

In operation, when a drive current is applied to a selected driving wire 2, a closed flux path 12 is formed at intersections of the driving wire 2 and the magnetic wire 1 as formed in the conventional thin film wire memory, as shown in FIG. 2(*b*). At places other than the intersections, a closed flux path 13 is also formed within the protruded portions 3″ of the magnetic keeper.

Accordingly, the demagnetizing field in the magnetic keeper 3 which has caused deformation or widening of the magnetic flux in the conventional memory can be reduced to minimum. Consequently, the magnetizing force around the driving wires 2 becomes stronger and the magnetic flux at the intersections hardly widens.

Now, when a magnetic thin film wire memory is produced as shown in FIG. 2(*a*) with the use of magnetic wires 1 having a diameter of 0.1mm, ribbon shaped driving wires 2 having a rectangular section of 0.05mm × 0.1mm, and an elastic ferrite magnetic keeper 3 of 0.1mm thickness, the spaces between the adjacent driving wires can be 0.4mm which is far narrower than those of 1mm in the conventional memory. Thus, the packing density of memory elements can be remarkably elevated in the present invention.

In a second embodiment shown in FIG. 3, a magnetic thin film plated wire memory comprises two magnetic keepers 3 and 3 laminated one upon the other with the protruded portions 3″ and 3″ of the magnetic keeper contacting with each other. One end of the driving wires 2 which are adjacent above and below is bent and electrically connected as shown in FIG. 3. The magnetic thin film plated wire memory in the second embodiment is so constructed that magnetic flux around the driving wires is effectively concentrated upon the magnetic wires. In addition, since the two magnetic keepers cooperatively enclose the magnetic wires, each of the magnetic keepers may have grooves shallower than those in the first embodiment and these shallow grooves are easier to make.

In a third embodiment shown in FIGS. 4 to 6, a conductive perforated plate 14 or mesh 15 is embedded into the magnetic keeper 3. The perforated plate 14 is made of a conductive plate 16 of 0.06mm thickness in which holes 17 of 0.1mm diameter are made by etching technique with spaces of 0.3mm from each other, as shown in FIG. 5. In place of the perforated plate 14, the conductive metal mesh 15 formed by knitting of extremely thin wires may be employed.

Through the perforated plate 14 is completely embedded within the magnetic keeper 3 in the embodiment shown in FIG. 4, it may be partially embedded in the magnetic keeper 3 with its bottom side exposing to the outside thereof.

In the magnetic thin film wire memory according to the third embodiment, an additional advantage can be obtained in that the conductive perforated plate 14 or mesh 15 serving as a ground plate do not come off from the magnetic keeper 3 while in assembly and after completion thereof and elastically reinforces the magnetic keeper 3. The ground plate serves as a magnetic shield for keeping away external magnetic influences.

Though the present invention has been described with reference to the preferred embodiments thereof, many modifications and alternations may be made. For example, each driving wire 2 may be a pair of wires, or may be a conductive wire consisting of a plurality of turns, which, as known, facilitates the reduction of the driving current.

What is claimed is:

1. A magnetic thin film plated wire memory comprising a magnetic keeper having a base portion and a number of elongated protrusions integrally formed with said base portion, said protrusions being spaced with each other at fixed spaces to form grooves therebetween, a number of driving wires embedded straight within said magnetic keeper to pass at right angles through said elongated protrusions with their upper surface exposing to the outside of said base portion of said magnetic keeper at said grooves, and a number of magnetic wires each snugly disposed in said grooves so that each groove carries one magnetic wire, said magnetic wire having a magnetic thin film plated on a conductive wire.

2. A magnetic thin film plated wire memory as claimed in claim 1 further comprising a second magnetic keeper having a base portion and a number of elongated protrusions integrally formed like said first magnetic keeper, said second magnetic keeper being laminated upon said first magnetic keeper with said protrusions of said both keepers contacting with each other, and a number of driving wires embedded in said second magnetic keeper like those embedded in said first magnetic keeper, each of said driving wire in said second magnetic keeper being electrically connected at its one end to the lower adjacent driving wire in said first magnetic keeper.

3. A magnetic thin film plated wire memory as claimed in claim 1, wherein a perforated plate is embedded in said magnetic keeper from the bottom thereof.

4. A magnetic thin film plated wire memory as claimed in claim 1, wherein a wire mesh is embedded in said magnetic keeper from the bottom thereof.

5. A magnetic thin film plated wire memory as claimed in claim 1, wherein a driving wire is a pair of conductive wires.

6. A magnetic thin film plated wire memory as claimed in claim 1, wherein the distance between adjacent driving wires is about 0.4 millimeters.

* * * * *